United States Patent
Yu et al.

(10) Patent No.: US 12,034,144 B2
(45) Date of Patent: *Jul. 9, 2024

(54) SOLID-STATE SYNTHESIS FOR THE FABRICATION OF A LAYERED ANODE MATERIAL

(71) Applicant: GM GLOBAL TECHNOLOGY OPERATIONS LLC, Detroit, MI (US)

(72) Inventors: Paul Taichiang Yu, Lake Orion, MI (US); Leng Mao, Troy, MI (US); Jeffrey David Cain, Royal Oak, MI (US); Andrew Clay Bobel, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/486,378

(22) Filed: Sep. 27, 2021

(65) Prior Publication Data
US 2023/0101215 A1    Mar. 30, 2023

(51) Int. Cl.
*H01M 4/00* (2006.01)
*H01M 4/04* (2006.01)
*H01M 4/02* (2006.01)

(52) U.S. Cl.
CPC ...... *H01M 4/049* (2013.01); *H01M 2004/027* (2013.01)

(58) Field of Classification Search
CPC .............................. H01M 4/00; H01M 10/00
See application file for complete search history.

(56) References Cited

U.S. PATENT DOCUMENTS

| 6,916,744 B2 | 7/2005 | Achutharaman et al. |
| 8,440,350 B1 | 5/2013 | Verbrugge et al. |

(Continued)

FOREIGN PATENT DOCUMENTS

| CN | 1802733 A | 7/2006 |
| CN | 107210433 A | 9/2017 |

(Continued)

OTHER PUBLICATIONS

"Efficient synthesis of orthorhombic lithium borate hydroxide micro rods and their thermal conversion to lithium borate", Wancheng Zhu, Liyun Zhang, Xili Cui, Qiang Zhang, (Year: 2011).*

(Continued)

*Primary Examiner* — David P Turocy
*Assistant Examiner* — Mohammad Mayy
(74) *Attorney, Agent, or Firm* — Harness, Dickey & Pierce, P.L.C.

(57) ABSTRACT

A method for forming a prelithiated, layered anode material includes contacting an ionic compound and a lithium precursor in an environment having a temperature ranging from about 200° C. to about 900° C. The ionic compound is a three-dimensional layered material represented by $MX_2$, where M is one of calcium (Ca) and magnesium (Mg) and X is one of silicon (Si), germanium (Ge), and boron (B). The lithium precursor is selected from the group consisting of: LiH, LiC, LiOH, LiCl, and combinations thereof. The contacting of the ionic compound and the lithium precursor in the environment causes removal of cations from the ionic compound to create openings in interlayer spaces or voids in the three-dimensional layered material thereby defining a two-dimensional layered material and also causes introduction of lithium ions from the lithium precursor into the interlayer spaces or voids to form the prelithiated, layered anode material.

19 Claims, 2 Drawing Sheets

(56) References Cited

U.S. PATENT DOCUMENTS

| | | | |
|---|---|---|---|
| 8,859,144 B2 | 10/2014 | Xiao | |
| 8,999,584 B2 | 4/2015 | Jiang et al. | |
| 9,005,811 B2 | 4/2015 | Xiao et al. | |
| 9,093,705 B2 | 7/2015 | Kiao et al. | |
| 9,142,830 B2 | 9/2015 | Xiao et al. | |
| 9,178,208 B2 | 11/2015 | Park et al. | |
| 9,302,914 B2 | 4/2016 | Liu et al. | |
| 9,362,551 B2 | 6/2016 | Sachdev et al. | |
| 9,379,374 B2 | 6/2016 | Liu et al. | |
| 9,397,338 B2 | 7/2016 | Park et al. | |
| 9,531,004 B2 | 12/2016 | Xiao et al. | |
| 9,553,303 B2 | 1/2017 | Park et al. | |
| 9,564,639 B2 | 2/2017 | Huang | |
| 9,570,752 B2 | 2/2017 | Huang et al. | |
| 9,577,251 B2 | 2/2017 | Xiao et al. | |
| 9,583,757 B2 | 2/2017 | Park et al. | |
| 9,780,361 B2 | 10/2017 | Xiao et al. | |
| 9,806,328 B2 | 10/2017 | Park et al. | |
| 10,062,898 B2 | 8/2018 | Xiao | |
| 10,797,303 B2 | 10/2020 | Cho et al. | |
| 10,797,312 B2 | 10/2020 | Cho et al. | |
| 11,011,742 B2 | 5/2021 | Sachdev et al. | |
| 11,316,142 B2 | 4/2022 | Jiang et al. | |
| 11,342,545 B2 | 5/2022 | Cain et al. | |
| 11,349,119 B2 | 5/2022 | Halalay et al. | |
| 11,374,218 B2 | 6/2022 | Jiang et al. | |
| 11,420,139 B2 | 8/2022 | Jiang et al. | |
| 11,824,198 B2 | 11/2023 | Son et al. | |
| 2006/0040182 A1 | 2/2006 | Kawakami et al. | |
| 2008/0050573 A1 | 2/2008 | Nakano et al. | |
| 2012/0251895 A1 | 10/2012 | Mun et al. | |
| 2013/0327648 A1 | 12/2013 | Grant et al. | |
| 2014/0065488 A1 | 3/2014 | Lee et al. | |
| 2014/0295273 A1 | 10/2014 | Mah et al. | |
| 2015/0118559 A1 | 4/2015 | Ito et al. | |
| 2015/0372291 A1 | 12/2015 | Kameyama et al. | |
| 2017/0162859 A1 | 6/2017 | Yang et al. | |
| 2017/0179482 A1 | 6/2017 | Verbrugge et al. | |
| 2018/0062153 A1 | 3/2018 | Zhu et al. | |
| 2018/0083268 A1 | 3/2018 | Huang | |
| 2018/0205114 A1 | 7/2018 | Pauric et al. | |
| 2018/0248175 A1 | 8/2018 | Ghezelbash et al. | |
| 2019/0067675 A1 | 2/2019 | Xiao | |
| 2019/0088922 A1 | 3/2019 | Zhamu et al. | |
| 2019/0088930 A1* | 3/2019 | Zhamu | H01M 4/366 |
| 2019/0148772 A1 | 5/2019 | Park et al. | |
| 2019/0181426 A1 | 6/2019 | Park et al. | |
| 2019/0305298 A1 | 10/2019 | Chae et al. | |
| 2019/0386314 A1 | 12/2019 | Lanning et al. | |
| 2020/0014026 A1* | 1/2020 | Song | H01M 10/0525 |
| 2020/0119339 A1 | 4/2020 | Halalay et al. | |
| 2020/0350558 A1 | 11/2020 | Jimenez et al. | |
| 2020/0388825 A1 | 12/2020 | Verbrugge et al. | |
| 2021/0050597 A1 | 2/2021 | Lin et al. | |
| 2021/0057752 A1 | 2/2021 | Jiang et al. | |
| 2021/0078012 A1* | 3/2021 | Kochhar | H01M 10/54 |
| 2021/0083264 A1 | 3/2021 | Jiang et al. | |
| 2021/0135194 A1 | 5/2021 | Wang et al. | |
| 2021/0175486 A1 | 6/2021 | Cain et al. | |
| 2021/0218016 A1 | 7/2021 | Chae et al. | |
| 2022/0029156 A1 | 1/2022 | Thackeray et al. | |
| 2022/0384773 A1 | 12/2022 | Cain et al. | |
| 2022/0384774 A1 | 12/2022 | Cain et al. | |
| 2022/0384776 A1 | 12/2022 | Cain et al. | |
| 2023/0060634 A1 | 3/2023 | Moylan et al. | |
| 2023/0101215 A1 | 3/2023 | Yu et al. | |

FOREIGN PATENT DOCUMENTS

| | | |
|---|---|---|
| CN | 107431192 A | 12/2017 |
| CN | 109994717 A | 7/2019 |
| CN | 110024048 A | 7/2019 |
| CN | 110600688 A | 12/2019 |
| CN | 111048747 A | 4/2020 |
| CN | 112928241 A | 6/2021 |
| CN | 115440945 A | 12/2022 |
| CN | 115440947 A | 12/2022 |
| CN | 115440970 A | 12/2022 |
| CN | 115744918 A | 3/2023 |
| CN | 115881946 A | 3/2023 |
| DE | 102019115818 A1 | 4/2020 |
| DE | 102020129335 A1 | 6/2021 |
| DE | 102022108412 A1 | 12/2022 |
| DE | 102022108463 A1 | 12/2022 |
| DE | 102022108466 A1 | 12/2022 |
| DE | 102022119823 A1 | 3/2023 |
| DE | 102022120235 A1 | 3/2023 |
| WO | WO-2020009494 A1 | 1/2020 |

OTHER PUBLICATIONS

Wolfenstine, J. "CaSi$_2$ as an anode for lithium-ion batteries." Journal of Power Sources 124.1 (2003): 241-245. (Year: 2003).

Castillo, Sarah M., et al. "Lattice dynamics of the rhombohedral polymorphs of CaSi$_2$." Inorganic Chemistry 55.20 (2016): 10203-10207. (Year: 2016).

Y. Tzeng et al., Nanomaterials, 10, (2020) 2467, 1-13. (Year: 2020).

Assresahegn, Birhanu Desalegn et al., "Effects of the Formulations of Silicon-Based Composite Anodes on their Mechanical, Storage, and Electrochemical Properties," *ChemSusChem*, 2017, 10, pp. 4080-4089, Published online: Sep. 25, 2017, DOI: 10.1002/cssc.201701281.

Cao, Peng-Fei et al., "Superstretchable, Self-Healing Polymeric Elastomers with Tunable Properties," *Adv. Funct. Mater.*, 2018, 28, 1800741, 9 pages, Published online: Apr. 16, 2018, DOI: 10.1002/adfm.201800741.

Cheng, Yong et al., "Influence of copper addition for silicon-carbon composite as anode materials for lithium ion batteries," *RSC Adv.*, 2016, 6, p. 56756-56764, Published online: Jun. 8, 2016, DOI: 10.1039/c6ra12332e.

Choi, Min-Jae et al., "Novel strategy to improve the Li-storage performance of micro silicon anodes," *Journal of Power Sources*, 2017, 348, pp. 302-310, Published online Mar. 10, 2017, DOI: 10.1016/j.jpowsour.2017.03.020.

Gómez-Cámer, Juan Luis et al., "Anchoring Si nanoparticles to carbon nanofibers: an efficient procedure for improving SI performance in Li batteries," *J. Mater. Chem.*, 2011, 21, pp. 811-818, Published Nov. 8, 2010, DOI: 10.1039/c0jm01811b.

Hassan, Fathy M. et al., "Engineered Si Electrode Nanoarchitecture: A Scalable Postfabrication Treatment for the Production of Next-Generation Li-Ion Batteries," *Nano Lett.*, 2014, 14, pp. 277-283, Published Dec. 12, 2013, DOI: 10.1021/nl403943g.

Huang, Xingkang et al., "Improved Cyclic Performance of Si Anodes for Lithium-Ion Batteries by Forming Intermetallic Interphases between Si Nanoparticles and Metal Microparticles," *ACS Appl. Mater. Interfaces*, 2013, 5, p. 11965-11970, Published Oct. 21, 2013, DOI: 10.1021/am403718u.

Jeong, You Kyeong et al., "Mussel-Inspired Coating and Adhesion for Rechargeable Batteries: A Review," *ACS Appl. Mater. Interfaces*, 2018, 10, pp. 7562-7573, Published online: Sep. 22, 2017, DOI: 10.1021/acsami.7b08495.

Jia, Haiping et al., "A novel approach to synthesize micrometer-sized porous silicon as a high performance anode for lithium-on batteries," *Nano Energy*, 2018, 50, pp. 589-597, Published online: May 21, 2018, DOI: 10.1016/j.nanoen.2018.05.048.

Joyce, Christopher et al., "Metallic Copper Binders for Lithium-Ion Battery Silicon Electrodes," *Journal of the Electrochemical Society*, 2012, 159 (6), pp. A909-A914, Published May 2, 2012, DOI: 10.1149/2.107206jes.

Kim, Donghyuk et al., "Freestanding silicon microparticle and self-healing polymer composite design for effective lithiation stress relaxation," *J. Mater. Chem. A*, 2016, 6, pp. 11353-11361, Published Jun. 4, 2018, DOI: 10.1039/c7ta11269f.

Kim, Jae Woo et al., "Improvement of silicon powder negative electrodes by copper electroless deposition for lithium secondary batteries," *Journal of Power Sources*, 2005, 147, pp. 227-233, Published online: Feb. 25, 2005, DOI: 10.1016/j.jpowsour.2004.12.041.

(56) References Cited

OTHER PUBLICATIONS

Leblanc, Dominic et al., "Silicon as anode for high-energy lithium ion batteries: From molten ingot to nanoparticles," *Journal of Power Sources*, 2015, 299, pp. 529-536, Published online: Sep. 21, 2015, DOI: 10.1016/j.powsour.2015.09.040.

Lestriez, B et al., "Hierarchical and Resilient Conductive Network of Bridged Carbon Nanotubes and Nanofibers for High-Energy Si Negative Electrodes," *Electrochemical and Solid-State Letters*, 2009, 12, 4, pp. A76-A80.

Lu, Zhenda et al., "Nonfilling Carbon Coating of Porous Silicon Micrometer-Sized Particles for High-Performance Lithium Battery Anodes," *ACS Nano*, 2015, 9, pp. 2540-2547, Published online Mar. 4, 2015, DOI: 10.1021/nn505410q.

Mazouzi, Driss et al., "Very High Surface Capacity Observed Using Si Negative Electrodes Embedded in Copper Foam as 3D Current Collectors," *Adv. Energy Mater.*, 2014, 4, 1301718, 13 pages, Published online: Feb. 13, 2014, DOI: 10.1002/aenm.201301718.

Munaoka, Takatoshi et al., "Ionically Conductive Self-Healing Binder for Low Cost Si Microparticles Anodes in Li-Ion Batteries," *Adv. Energy Mater.*, 2018, 8, 1703138, 11 pages, Published online: Feb. 12, 2018, DOI: 10.1002/aenm.201703138.

Polat, B.D. et al., "Improving Si anode Performance by Forming Copper Capped Copper-Silicon Thin Film Anodes for Rechargeable Lithium Ion Batteries," *Electrochimica Acta*, 2015, 170, pp. 63-71, Published online Apr. 25, 2015, DOI: 10.1013/j.electacta.2015.04.131.

Sethuraman, Vijay A. et al., "Increased cycling efficiency and rate capability of copper-coated silicon anodes in lithium-ion batteries," *Journal of Power Sources*, 2011, 196, pp. 393-398, Published online Jun. 23, 2010, DOI: 10.1016/j.powsour.2010.06.043.

Wang, Chao et al., "Self-healing chemistry enables the stable operation of silicon microparticle anodes for high-energy lithium-ion batteries," *Nature Chemistry*, 2013, 5, pp. 1042-1048, Published online Nov. 17, 2013, DOI: 10.1038/nchem.1802.

Wang, Jing et al., "Encapsulating micro-nano $Si/SiO_x$ into conjugated nitrogen-doped carbon as binder-free monolithic anodes for advanced lithium ion batteries," *Nanoscale*, 2015, 7, pp. 8023-8034, Published Mar. 23, 2015, DOI: 10.1039/5nr01209k.

Yoon, Sukeun et al., "Enhancement of capacity of carbon-coated $Si-Cu_3Si$ composite anode using metal-organic compound for lithium-ion batteries," *Journal of Power Sources*, 2006, 161, pp. 1319-1323, Published online: Jul. 24, 2006, DOI: 10.1016/j.jpowsour.2006.06.035.

U.S. Appl. No. 17/335,972, filed Jun. 1, 2021, Jeffrey David Cain et al.

U.S. Appl. No. 17/335,987, filed Jun. 1, 2021, Jeffrey David Cain et al.

U.S. Appl. No. 17/465,012, filed Sep. 2, 2021, Thomas E. Moylan et al.

First Office Action for Chinese Patent Application No. 202211046787.6 issued on Dec. 1, 2023, with correspondence from China Patent Agent (H.K.) Ltd. summarizing Office Action; 12 pages.

\* cited by examiner

SOLID-STATE SYNTHESIS FOR THE FABRICATION OF A LAYERED ANODE MATERIAL

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge its available capacity by an external power source, which reverses the electrochemical reactions that transpired during discharge.

Many different materials may be used to create components tier a lithium ion battery. For example, positive electrode materials for lithium batteries typically comprise an electroactive material which can be intercalated with lithium ions, such as lithium-transition metal oxides or mixed oxides, for example including $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or one or more phosphate compounds, for example including lithium iron phosphate or mixed lithium manganese-iron phosphate. The negative electrode typically includes a lithium insertion material or an alloy host material. For example, typical electroactive materials for forming an anode include graphite and other forms of carbon, silicon and silicon oxide, tin and tin alloys.

Certain anode materials have particular advantages. While graphite having a theoretical specific capacity of 372 $mAh·g^{-1}$ is most widely used in lithium-ion batteries, anode materials with high specific capacity, for example high specific capacities ranging about 900 $mAh·g^{-1}$ to about 4,200 $mAh·g^{-1}$, are of growing interest. For example, silicon has the highest known theoretical capacity for lithium (e.g., about 4,200 $mAh·g^{-1}$), making it an appealing materials for rechargeable lithium ion batteries. However, anodes comprising silicon may suffer from drawbacks. For example, excessive volumetric expansion and contraction (e.g., about 400% for silicon as compared to about 10% for graphite) during successive charging and discharging cycles. Such volumetric changes may lead to fatigue cracking and decrepitation of the electroactive material, as well as pulverization of material particles, which in turn may cause a loss of electrical contact between the silicon-containing electroactive material and the rest of the battery cell resulting in poor capacity retention and premature cell failure. This is especially true at electrode loading levels required for the application of silicon-containing electrodes in high-energy lithium-ion batteries, such as those used in transportation applications. Accordingly, it would be desirable to develop high performance electrode materials, particularly comprising silicon and/or other electroactive materials that undergo significant volumetric changes during lithium ion cycling, and methods for preparing such high performance electrodes materials, for use in high energy and high power lithium ion batteries, that can address these challenges.

SUMMARY

This section provides a general summary of the disclosure, and is not a comprehensive disclosure of its full scope or all of its features.

The present disclosure relates to a layered anode material (for example, a two-dimensional ("2D"), layered silicon allotrope), and methods of forming the same (for example, solid-state batch processes).

In various aspects, the present disclosure provides a method for forming a prelithiated, layered anode material. The method may include contacting an ionic compound and a lithium precursor in an environment having a temperature greater than or equal to about 200° C. to less than or equal to about 900° C., where the ionic compound is a three-dimensional layered material and the contacting of the ionic compound and the lithium precursor in the environment causes removal of cations from the ionic compound to create openings in interlayer spaces or voids in the three-dimensional layered material thereby defining a two-dimensional layered material and introduction of lithium ions from the lithium precursor into the interlayer spaces or voids to form the prelithiated, layered anode material.

In one aspect, the ionic compound may be represented by $MX_2$, where M is one of calcium (Ca) and magnesium (Mg) and X is one of silicon (Si), germanium (Ge), and boron (B), and the ionic compound comprises alternating layers of M and X.

In one aspect, the lithium precursor may be selected from the group consisting of: LiH, LiC, LiOH, LiCl, and combinations thereof.

In one aspect, a ratio of the ionic compound to the lithium precursor may be greater than or equal to about 1:1 to less than or equal to about 5:1.

In one aspect, the method may further include surface treating one or more exposed surfaces of the prelithiated, layered anode material.

In one aspect, the surface treating of the one or more exposed surfaces of the prelithiated, layered anode material may include contacting the one or more exposed surfaces of the prelithiated, layered anode material with a carbon dioxide to form one or more lithium carbonate layers on the one or more exposed surfaces of the prelithiated, layered anode material.

In one aspect, the surface treating of the one or more exposed surfaces of the prelithiated, layered anode material may include contacting the one or more exposed surfaces of the prelithiated, layered anode material with a chemical bath to form one or more coatings on the one or more surfaces of the prelithiated, layered anode material, where the chemical bath comprises an electrolyte.

In one aspect, the method may further include separating the prelithiated, layered anode material and the remaining cationic material including the cations using a density separation process, where the prelithiated, layered anode material has a first density and the remaining cationic material has a second density, the first density being less than the second density. The density separation process may include contacting the prelithiated, layered anode material with an anhydrous solvent or mixture of solvents having a third density that is between the first density and the second density, where upon stirring of the anhydrous solvent or mixture of solvents the prelithiated, layered anode material may be collected at a top surface of the anhydrous solvent or mixture of solvents and the remaining cationic material may be collected at a bottom surface of the anhydrous solvent or mixture of solvents.

In one aspect, the environment may include one or more inert gases.

In one aspect, the environment may include carbon dioxide.

In various aspects, the present disclosure provides a method for forming a prelithiated, layered anode material. The method may include ball milling an ionic compound and a lithium precursor to form an admixture. Te ionic compound may be a three-dimensional layered material represented by $MX_2$, where M is one of calcium (Ca) and magnesium (Mg) and X is one of silicon (Si), germanium (Ge), and boron (B). The lithium precursor may be selected from the group consisting of: LiH, LiC, LiOH, LiCl, and combinations thereof. The method may further include heating the admixture to a high temperature greater than or equal to about 200° C. to less than or equal to about 900° C., where the high temperature causes cations to move from the ionic compound to create openings in interlayer spaces or voids in the three-dimensional layered material thereby defining a two-dimensional layered material and the high temperature introduces lithium ions from the lithium precursor into the interlayer spaces or voids to form the prelithiated, layered anode material.

In one aspect, a ratio of the ionic compound to the lithium precursor may be greater than or equal to about 1:1 to less than or equal to about 5:1.

In one aspect, the method may further includes contacting the one or more exposed surfaces of the prelithiated, layered anode material with carbon dioxide to form one or more lithium carbonate layers on the one or more exposed surfaces of the prelithiated, layered anode material.

In one aspect, the method may further include contacting the one or more exposed surfaces of the prelithiated, layered anode material with a chemical bath to form more coatings on the one or more surfaces of the prelithiated, layered anode material, wherein the chemical bath comprises an electrolyte.

In one aspect, the method may further include separating the prelithiated, layered anode material and the remaining cationic material including the cations using a density separation process, where the prelithiated, layered anode material has a first density and the remaining cationic material has a second density, the first density being less than the second density. The density separation process may include contacting the prelithiated, layered anode material with an anhydrous solvent or mixture of solvents having a third density that is between the first density and the second density, where upon stirring of the anhydrous solvent or mixture of solvents the prelithiated, layered anode material may be collected at a top surface of the anhydrous solvent or mixture of solvents and the remaining cationic material may be collected at a bottom surface of the anhydrous solvent or mixture of solvents.

In various aspects, the present disclosure provides method for forming a prelithiated, layered anode material. The method may include contacting an ionic compound and a lithium precursor in an environment having a temperature greater than or equal to about 200° C. to less than or equal to about 900° C. The ionic compound may be a three-dimensional layered material represented by $MX_2$, where M is one of calcium (Ca) and magnesium (Mg) and X is one of silicon (Si), germanium (Ge), and boron (B). The contacting of the ionic compound and the lithium precursor in the environment may cause removal of cations from the ionic compound to create openings in interlayer spaces or voids in the three-dimensional layered material thereby defining a two-dimensional layered material and causes introduction of lithium ions from the lithium precursor into the interlayer spaces or voids to form the prelithiated, layered anode material. The method may further include separating the prelithiated, layered anode material and a remaining cationic material including the cations using a density separation process, where the prelithiated, layered anode material has a first density and the remaining cationic material has a second density, the first density being less than the second density. The density separation process may include contacting, the prelithiated, layered anode material with an anhydrous solvent or mixture of solvents having a third density that is between the first density and the second density. Upon stirring of the anhydrous solvent or mixture of solvents the prelithiated, layered anode material may be collected at a top surface of the anhydrous solvent or mixture of solvents and the remaining cationic material may be collected at a bottom surface of the anhydrous solvent or mixture of solvents.

In one aspect, a ratio of the ionic compound to the lithium precursor may be greater than or equal to about 1:1 to less than or equal to about 5:1.

In one aspect, the lithium precursor may be selected from the group consisting of: LiH, LiC, LiOH, LiCl, and combinations thereof.

In one aspect, the method may further include contacting the one or more exposed surfaces of the prelithiated, layered anode material with carbon dioxide to form one or more lithium carbonate layers on the one or more exposed surfaces of the prelithiated, layered anode material.

In one aspect, the method may further include contacting the one or more exposed surfaces of the prelithiated, layered anode material with a chemical bath to form one or more coatings on the one or more surfaces of the prelithiated, layered anode material, wherein the chemical bath comprises an electrolyte.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
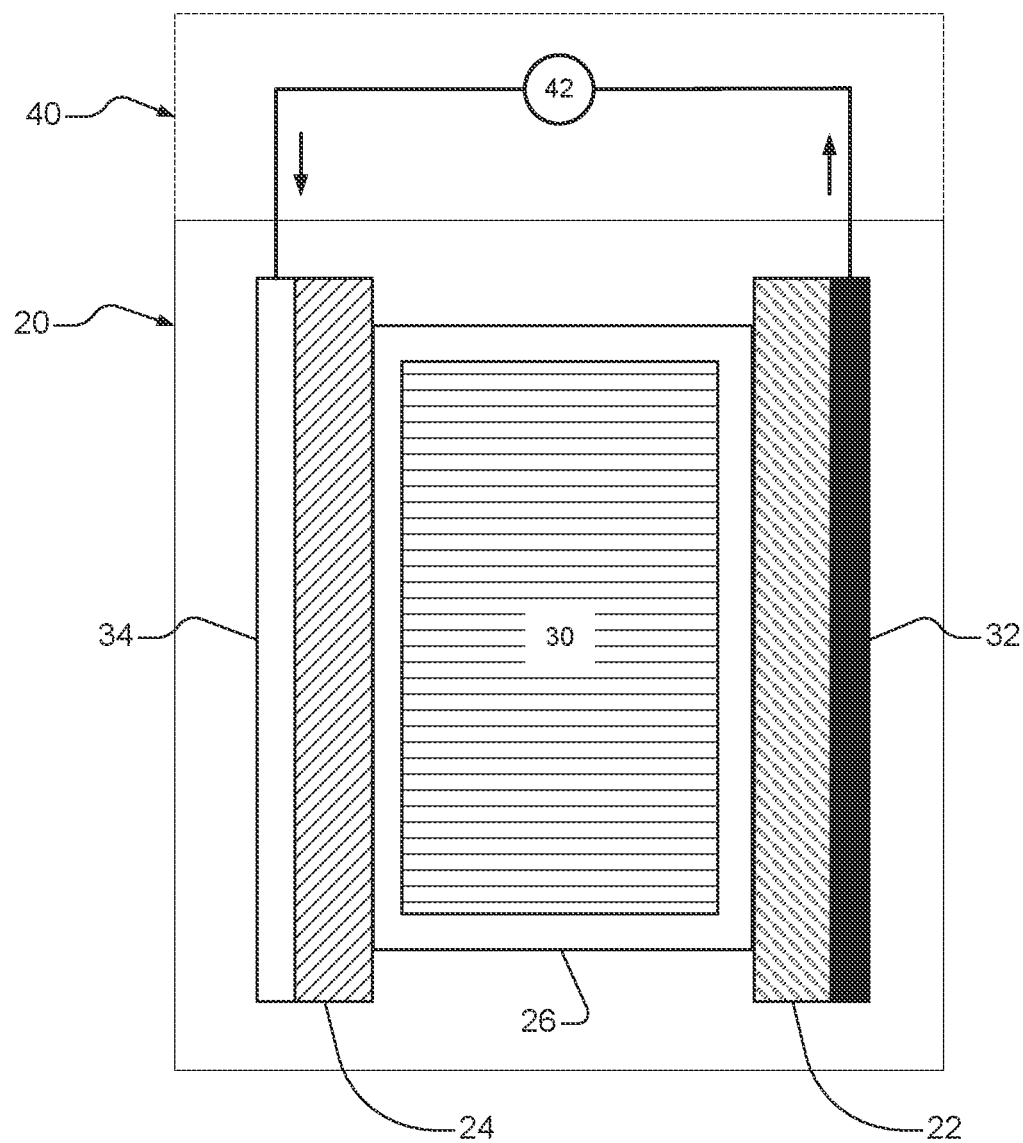
FIG. 1 is a schematic of an example electrochemical battery cell including a layered electroactive material in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to a pre-lithiated, layered anode material for an electrochemical cell that cycles lithium ions, and to methods of forming the same. The layered anode material may be a pre-lithiated, two-dimensional ("2D"), layered silicon allotrope. Methods for forming the layered anode material may include contacting an ionic compound (for example, represented by $MX_2$, where M is one of calcium (Ca) and magnesium (Mg) and X is one of silicon (Si), germanium (Ge), and/or boron (B)) having alternating layers of cations and anions and a lithium precursor (e.g., lithium hydride (LiH), LiC, LiOH, or LiCl) in a high-temperature environment (for example, about 200° C. to about 900° C.) and using density separation to separate the resulting products (for example, $CaH_2$ and $Li_xSi$). For example, in certain variations, the ionic compound may include $CaSi_2$, which is a compound including alternating layers of silicon and calcium. The high-temperature environment may cause the ionic compound to decompose such that the cations (e.g., $Ca^{2+}$) move away from the crystal-layered structure creating (i.e., leaving behind) a two-dimensional, metal (e.g., silicon) layered crystal. Stated in another way, the high temperature environment can create openings in interlayer spaces or voids in the three-dimensional layered ionic material where the cations have migrated away. The two-dimensional, metal layered crystal may be prelithiated to form the pre-lithiated, layered anode material by the movement of lithium ions ($Li^+$), for example from the lithium precursor, into the interlayer spaces or voids created by the removal of the cation. The lithium ions may move into the interlayer spaces or voids simultaneously, or concurrently, with the removal of the cations in the high-temperature environment.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions (or sodium ions in the case of sodium-ion batteries, and the like) and may be in liquid, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single positive electrode cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation prevents physical contact between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte. For example, the separator 26 may be defined by a plurality of solid-state electrolyte particles (not shown).

A negative electrode current collector 32 may be positioned at or near the negative electrode 22. The negative electrode current collector 32 may be a metal foil, metal grid or screen, or expanded metal comprising copper or any other appropriate electrically conductive material known to those of skill in the art. A positive electrode current collector 34 may be positioned at or near the positive electrode 24. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries that include solid-state electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), bis(fluorosulfonyl)imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain variations, the separator 26 may also be mixed with a ceramic material or its surface may be coated in a ceramic material. For example, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), titania ($TiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26.

In various aspects, the porous separator 26 and the electrolyte 30 in FIG. 1 may be replaced with a solid-state electrolyte ("SSE") (not shown) that functions as both an electrolyte and a separator. The solid-state electrolyte may be disposed between the positive electrode 24 and negative electrode 22. The solid-state electrolyte facilitates transfer of lithium ions, while mechanically separating and providing electrical insulation between the negative and positive electrodes 22, 24. By way of non-limiting example, solid-state electrolytes may include $LiTi_2(PO_4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The positive electrode 24 may be formed from a lithium-based active material (or a sodium-based active material in the instance of sodium-ion batteries) that is capable of undergoing lithium intercalation and deintercalation, alloying and dealloying, or plating and stripping, while functioning as the positive terminal of the battery 20. The positive electrode 24 can be defined by a plurality of electroactive material particles (not shown) disposed in one or more layers so as to define the three-dimensional structure of the positive electrode 24. The electrolyte 30 may be introduced, for example after cell assembly, and contained within pores (not shown) of the positive electrode 24. For example, the positive electrode 24 may include a plurality of electrolyte particles (not shown). In each instance, the positive electrode 24 may have a thickness greater than or equal to about 1 µm to less than or equal to about 500 µm, and in certain aspects, optionally greater than or equal to about 10 µm to less than or equal to about 200 µm. The positive electrode 24 may have a thickness greater than or equal to 1 µm to less than or equal to 500 µm, and in certain aspects, optionally greater than or equal to 10 µm to less than or equal to 200 µm.

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), or lithium iron fluorophosphate ($Li_2FePO_4F$).

In certain variations, the positive electroactive materials may be optionally intermingled with an electronically conducting material that provides an electron conduction path and/or at least one polymeric binder material that improves the structural integrity of the electrode. For example, the positive electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The positive electrode 24 may include greater than or equal to about 80 wt. % to less than or equal to about 99 wt. % of the positive electroactive material, greater than or equal to 0 wt. % to less than or equal to about 15 wt. % of the electronically conducting material, and greater than or equal to 0 wt. % to less than or equal to about 15 wt. %, and in certain aspects, optionally greater than or equal to 0 wt. % to less than or equal to about 15 wt. %, of the at least one polymeric binder. The positive electrode 24 may include greater than or equal to 80 wt. % to less than or equal to 99 wt. % of the positive electroactive material, greater than or equal to 0 wt. % to less than or equal to 15 wt. % of the electronically conducting material, and greater than or equal to 0 wt. % to less than or equal to 15 wt. %, and in certain aspects, optionally greater than or equal to 0 wt. % to less than or equal to 15 wt. %, of the at least one polymeric binder.

The negative electrode 22 comprises a lithium host material (or a sodium-based active material in the instance of sodium-ion batteries) that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22.

The electrolyte 30 may be introduced, for example after cell assembly, and contained within pores (not shown) of the negative electrode 22. For example, the negative electrode 22 may include a plurality of electrolyte particles (not shown). In each instance, the negative electrode 22 may have a thickness greater than or equal to about 1 μm to less than or equal to about 500 μm, and in certain aspects, optionally greater than or equal to about 10 μm to less than or equal to about 200 μm. The negative electrode 22 may have a thickness greater than or equal to 1 μm to less than or equal to 500 μm, and in certain aspects, optionally greater than or equal to 10 μm to less than or equal to 200 μm.

In various aspects, the negative electroactive material includes an atomically layered anode material, where each crystallographic plane is considered a layer. The atomically layered anode material may include silicon (Si), germanium (Ge), and/or boron (B). For example, the electroactive material may include a two-dimensional, layered allotrope of silicon (Si), germanium (Ge), and/or boron (B) including planes of atoms strongly bound in-plane and weakly coupled out of plane (i.e., little to no bonding between layers) at an angstrom scale, similar to graphite. In other words, the atomically layered anode material may include silicene, a multi-layered silicene, germanene, a multi-layered germanene, borophene, a multilayer borophene, or any combination thereof. The atomically layered anode material may form micro/nano scale electroactive particles, for example electroactive material particles having an average diameter greater than or equal to about 100 nm to less than or equal to about 50 μm. The electroactive material particles may have an average diameter greater than or equal to 100 nm to less than or equal to 50 μm.

Such negative electroactive materials may exhibit improve cyclability, for example, the two-dimensional negative electroactive materials may have an intrinsic capacity of about 2,000 mAh/g at about 100 mA/g current. The two-dimensional negative electroactive materials may have an intrinsic capacity of 2,000 mAh/g at 100 mA/g current. The layered structure may serve to relieve internal stresses that arise during lithiation and enhance ionic diffusion within the negative electrode 22. For example, the two-dimensional structure may allow lithium ions to intercalate between the layers via pseudo van der Waals gaps, to store lithium ions without destroying the lattice structure thereby helping to avoid pulverization or decrepitation of the structure (similar to intercalation of lithium in graphite). Additionally, the two-dimensional channels formed between layers may better facilitate ionic diffusion to permit faster charge rates.

In various aspects, the negative electroactive material may be a composite including a combination of the layered anode material (e.g., silicene, germanene, and/or borophene), for example in the form of a first plurality of electroactive material particles, and another negative electroactive material, such as graphite, graphene, carbon nanotubes, carbon nanofibers, carbon black, or any combination thereof, for example in the form of a second plurality of electroactive material particles. In certain variations, the composite may include greater than or equal to about 5 wt. % to less than or equal to about 95 wt. % of the layered anode material, and greater than or equal to about 5 wt. % to less than or equal to about 95 wt. % of the other negative electroactive material. The composite may include greater than or equal to 5 wt. % to less than or equal to 95 wt. % of the layered anode material, and greater than or equal to 5 wt. % to less than or equal to 95 wt. % of the other negative electroactive material.

In still further variations, the negative electroactive material may be a composite include a combination of the two-dimensional, layered allotrope (e.g., two-dimensional, layered silicon allotrope for example in the form of a first plurality of electroactive material particles), and a three-dimensional allotrope (e.g., three-dimensional, layered silicon allotrope, such as $SiO_x$ and $Li_xSiO_x$), for example in the form of a second plurality of electroactive material particles. For example, the composite may include greater than or equal to about 5 wt. % to less than or equal to about 95 wt. % of the two-dimensional, layered silicon allotrope, and greater than or equal to about 5 wt. % to less than or equal to about 95 wt. % of the three-dimensional silicon allotrope. The composite may include greater than or equal to 5 wt. % to less than or equal to 95 wt. % of the two-dimensional, layered silicon allotrope, and greater than or equal to 5 wt. % to less than or equal to 95 wt. % of the three-dimensional silicon allotrope.

In each instance, the negative electroactive material may be pre-lithiated, so as to compensate for lithium losses during cycling, such as may result during conversion reactions and/or the formation of $Li_xSi$ and/or a solid electrolyte interphase (SEI) layer (not shown) on the negative electrode 22 during the first cycle, as well as ongoing lithium loss due to, for example, continuous solid electrolyte interphase (SEI) formation.

In various aspects, the layered anode material may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The negative electrode 22 may include greater than or equal to about 10 wt. % to less than or equal to about 99 wt. % of the layered anode material, greater than or equal to 0 wt. % to less than or equal to about 20 wt. % of the electronically conducting material, and greater than or equal to 0 wt. % to less than or equal to about 20 wt. %, and in certain aspects, optionally greater than or equal to about 1 wt. % to less than or equal to about 20 wt. %, of the at least one polymeric binder. The negative electrode 22 may include greater than or equal to 10 wt. % to less than or equal to 99 wt. % of the layered anode material, greater than or equal to 0 wt. % to less than or equal to 20 wt. % of the electronically conducting material, and greater than or equal to 0 wt. % to less than or equal to 20 wt. %, and in certain aspects, optionally greater than or equal to 1 wt. % to less than or equal to 20 wt. %, of the at least one polymeric binder.

In various aspects, the present disclosure provides methods of making a pre-lithiated, layered anode material (e.g., pre-lithiated, two-dimensional, layered silicon allotrope) for use in negative electrodes, such as negative electrode 22 illustrated in FIG. 1. For example, methods for forming the layered anode material may generally include contacting an ionic compound (for example, represented by $MX_2$, where M is one of calcium (Ca) and magnesium (Mg) and X is one of silicon (Si), germanium (Ge), and/or boron (B)) having alternating layers of cations and anions and a lithium precursor (e.g., lithium hydride (LiH), LiC, LiOH, or LiCl) in a high-temperature environment (for example, about 200° C. to about 900° C.) and using density separation to separate the resulting products (for example, $CaH_2$ and $Li_xSi$). In each instance, the methods may be performed using either batch processes or continuous pactingrocesses.

Figure 2:
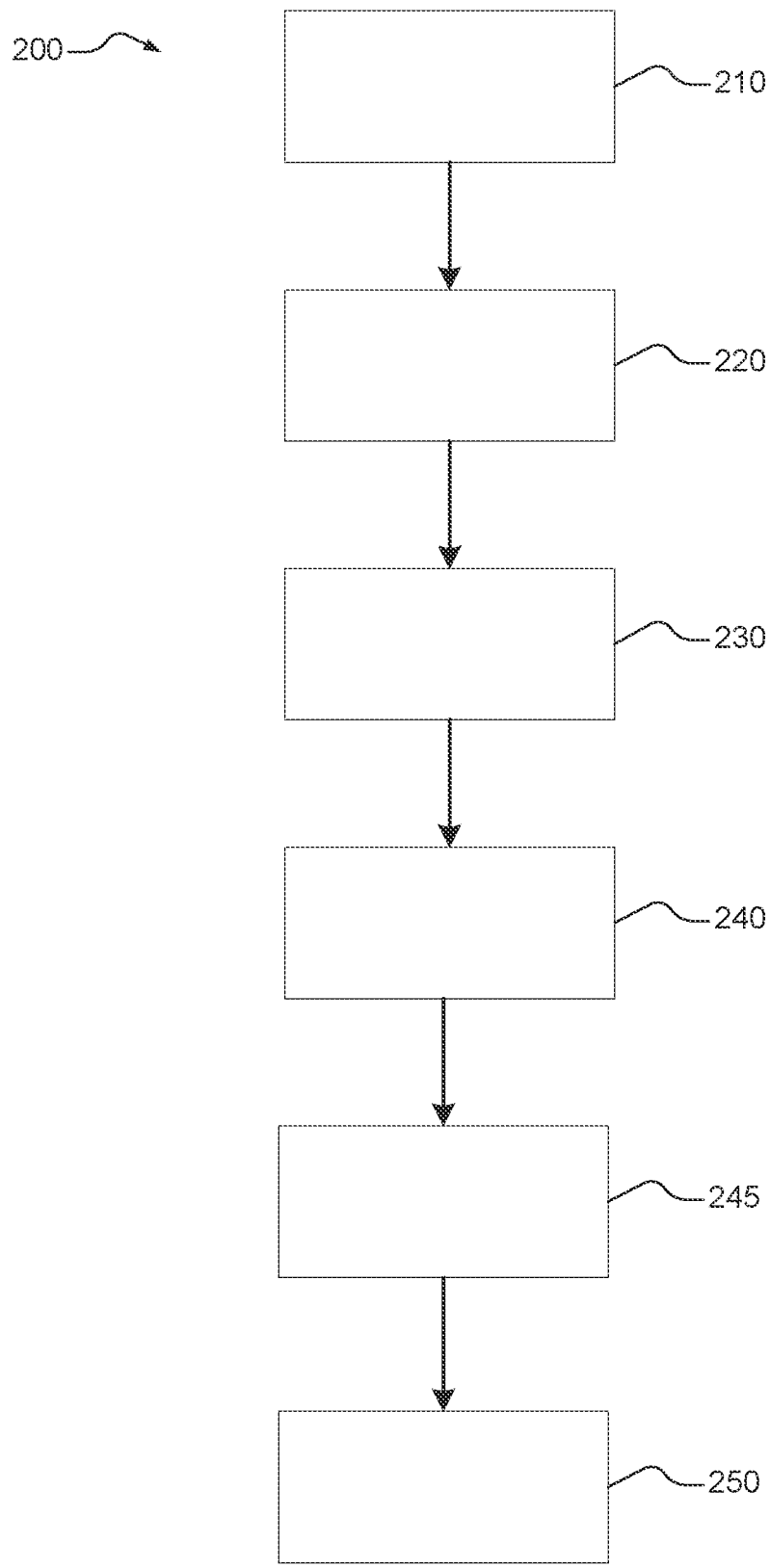
FIG. 2 is a flowchart illustrating an exemplary method for fabricating a layered electroactive material for use in an electrochemical battery cell, like the example electrochemical battery cell illustrated in FIG. 1, in accordance with various aspects of the present disclosure.

FIG. 2 illustrates an exemplary method 200 for forming a pre-lithiated, layered anode material. The method 200 includes contacting 220 an ionic compound and a lithium precursor in a high-temperature environment having, for example, a temperature greater than or equal to about 200° C. to less than or equal to about 900° C., and in certain aspects, optionally greater than or equal to about 200° C. to less than or equal to about 500° C. The method 200 may include contacting 220 an ionic compound and a lithium precursor in a high-temperature environment having, for example, a temperature greater than or equal to 200° C. to less than or equal to 900° C., and in certain aspects, optionally greater than or equal to 200° C. to less than or equal to 500° C. A ratio of the ionic compound to the lithium precursor may be greater than or equal to about 1:1 to less than or equal to about 5:1, and in certain aspects, optionally greater than or equal to about 1:1 to less than or equal to about 3:1. A ratio of the ionic compound to the lithium precursor may be greater than or equal to 1:1 to less than or equal to 5:1, and in certain aspects, optionally greater than or equal to 1:1 to less than or equal to 3:1.

The high-temperature environment may be a furnace including one or more inert gases and/or carbon dioxide ($CO_2$). Although not illustrated, the skilled artisan will appreciate that in certain various, the ionic compound and the lithium precursor may be contacted and the admixture may be subsequently heated to a temperature greater than or equal to about 200° C. to less than or equal to about 900° C., and in certain aspects, optionally greater than or equal to about 200° C. to less than or equal to about 500° C.

In each variation, the lithium precursor may be a stable lithium precursor (such as, lithium hydride (LiH), LiC, LiOH, or LiCl), as compared to less stable metallic or potentially molten lithium. The ionic compound may be represented by $MX_2$, where M is one of calcium (Ca) and magnesium (Mg) and X is one of silicon (Si), germanium (Ge), and/or boron (B). In each instance, the ionic compound includes alternating layers, such that the cations (e.g., $Ca^{2+}$) are amenable to ionic exchange. For example, contacting 220 the ionic compound and the lithium precursor in the high-temperature environment may facilitate removal of the cations from the ionic compound, creating a two-dimensional, layered material (e.g., van der Waals crystal). As the cations are removed, openings in interlayer spaces or voids in the ionic material may form. Thus, lithium ions ($Li^+$) may move from the lithium precursor into these openings in the interlayer spaces or voids created by the removal of the cation, so as to form the prelithiated, layered anode material.

For example, in the high-temperature environment, and when the lithium precursor includes lithium hydride (LiH) and the ionic precursor includes $CaSi_2$, the lithium may react with the metal (e.g., silicon) so as to produce LiSi, while the hydrogen reacts with the cation to form $CaH_2$. For example, as represented by:

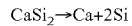
$$CaSi_2 \rightarrow Ca + 2Si$$

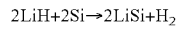
$$2LiH + 2Si \rightarrow 2LiSi + H_2$$

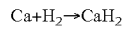
$$Ca + H_2 \rightarrow CaH_2$$

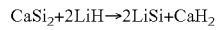
$$CaSi_2 + 2LiH \rightarrow 2LiSi + CaH_2$$

Thus, the method 200 provides a one-step, concurrent or simultaneous process for removing cations and prelithiating the two-dimensional, layered material, eliminating or reducing the costs and time associated with subsequent lithiating steps. In certain variations, substantially all, or in certain variations, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, optionally greater than or equal to about 99%, or optionally, greater than or equal to about 99.5%, of the cations may be removed from the ionic precursor material and replaced with lithium ions ($Li^+$).

In various aspects, the method 200 may include obtaining or preparing 210 the ionic compound and/or the lithium precursor. For example, in certain variations, preparing 210 the ionic compound may include grinding the precursor materials so to reduce particle size (e.g., to an average particle size diameter of greater than or equal to about 100 nm to less than or equal to about 50 μm) and increase surface area, thereby reducing cationic exchange time and increasing the likelihood of producing a uniformed two-dimensional, layered material.

In various aspects, the method 200 may include agitating 230 the ionic compound and the lithium precursor to ensure uniformity, for example to ensure that ion exchange is performed on substantially all particles to the same or similar degree. In certain variations, the ionic compound and the lithium precursor may be agitated 230 using a ball milling, or other circulating, process.

In various aspects, the method 200 may include extracting 240 the prelithiated, layered anode material—that is, the method 200 may include separating the prelithiated, layered anode material (e.g., LiSi) and the remaining cationic material that includes the removed cation (e.g., $CaH_2$). In various aspects, the prelithiated, layered anode material may be separated from the remaining cation material using density. The prelithiated, layered anode material may have a first density, and the remaining cationic material including the removed cation may have a second density, where the first density is less than the second density. The density gradient process may include contacting, for example mixing, the prelithiated, layered anode material and an anhydrous solvent or mixture of solvents, where the anhydrous solvent or mixture of solvents has a third density that is between the first density and the second density. Upon stirring of the anhydrous solvent or mixture of solvents the prelithiated, layered anode material can be collected at a top surface of the anhydrous solvent or mixture of solvents and the cations can be collected at a bottom surface of the anhydrous solvent or mixture of solvents. For example, the density of $CaH_2$ is about 1.7 g/cm³, while the specific density of lithium silicide (LiSi) is less than about 1 g/cm³. Because of the density differences, the lithium silicide (LiSi) may be separated from the remaining cationic material (e.g., $CaH_2$) by adding anhydrous solvent, such as ethylene carbonate (EC) having a density of about 1.32 g/cm$^3$. The lighter lithium silicide (LiSi) can be collected at a top surface of the ethylene carbonate, while the heavier remaining cationic material (e.g., CaH$_2$) can be collected at the bottom of a container including the ethylene carbonate.

In various aspects, the method 200 may include surface treating 245 the extracted prelithiated, layered anode material. Surface treating 245 the prelithiated, layered anode material may improve the air stability and/or dry-room compatibility of the prelithiated, layered anode material. In certain variations, the surface treatment 245 may include exposing the prelithiated, layered anode material to carbon dioxide (CO$_2$) so as to from a lithium carbonate (Li$_2$CO$_3$) coating or coatings on one or more exposed surfaces of the prelithiated, layered anode material. In other variations, the surface treatment 245 may include immerging the prelithiated, layered anode material in a chemical bath including for example electrolytes as detailed above, so as to from an artificial solid-state electrolyte interface (SEI), or other coatings, on one or more exposed surfaces of the prelithiated, layered anode material. The lithium carbonate coating (s) and/or artificial solid-state electrolyte interface (SEI) layer(s) and/or other coating(s) may be nanoscale (e.g., thicknesses greater than or equal to about 10 nm to less than or equal to about 1 μm) coatings of inert, air-stable compounds that allow the prelithiated, layered anode material to be handled safely in ambient or in a dry-room environments.

In various aspects, the method 200 may include incorporating 250 the prelithiated, layered anode material (and optionally, the first current collector), and/or the surface-stabilized prelithiated, layered anode material (and optionally, the first current collector), into a cell to be used as the negative electroactive material (and negative current collector). Although not illustrated, in various aspects, the method 200 may further include additional coating steps and/or other post-processing steps, for example to enhance air stability of the prelithiated, layered anode material, and/or mixing the prelithiated, layered anode material and another negative electroactive material, such as three a three-dimensional silicon allotrope and/or graphite/graphene, prior to incorporation into a cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a prelithiated, layered anode material, the method comprising:
    contacting an ionic compound and a lithium precursor in an environment having a temperature greater than or equal to about 200° C. to less than or equal to about 900° C., wherein the ionic compound is a three-dimensional layered material represented by MX$_2$, where M is one of calcium (Ca) and magnesium (Mg) and X is one of silicon (Si), germanium (Ge), and boron (B), the ionic compound comprises alternating layers of M and X, and the contacting of the ionic compound and the lithium precursor in the environment causes removal of M from the ionic compound to create openings in interlayer spaces or voids in the three-dimensional layered material thereby defining a two-dimensional layered material and introduction of lithium ions from the lithium precursor into the interlayer spaces or voids to form the prelithiated, layered anode material.

2. The method of claim 1, wherein the lithium precursor is selected from the group consisting of: LiH, LiC, LiOH, LiCl, and combinations thereof.

3. The method of claim 1, wherein a ratio of the ionic compound to the lithium precursor is greater than or equal to about 1:1 to less than or equal to about 5:1.

4. The method of claim 1, further comprising:
    surface treating one or more exposed surfaces of the prelithiated, layered anode material.

5. The method of claim 4, wherein the surface treating of the one or more exposed surfaces of the prelithiated, layered anode material comprises:
    contacting the one or more exposed surfaces of the prelithiated, layered anode material with a carbon dioxide to form one or more lithium carbonate layers on the one or more exposed surfaces of the prelithiated, layered anode material.

6. The method of claim 4, wherein the surface treating of the one or more exposed surfaces of the prelithiated, layered anode material comprises:
    contacting the one or more exposed surfaces of the prelithiated, layered anode material with a chemical bath to form one or more coatings on the one or more surfaces of the prelithiated, layered anode material, wherein the chemical bath comprises an electrolyte.

7. The method of claim 1, further comprising:
    separating the prelithiated, layered anode material and the remaining cationic material including the cations using a density separation process, wherein the prelithiated, layered anode material has a first density and the remaining cationic material has a second density, the first density being less than the second density, and wherein the density separation process comprises:
        contacting the prelithiated, layered anode material with an anhydrous solvent or mixture of solvents having a third density that is between the first density and the second density, wherein upon stirring of the anhydrous solvent or mixture of solvents the prelithiated, layered anode material can be collected at a top surface of the anhydrous solvent or mixture of solvents and the remaining cationic material can be collected at a bottom surface of the anhydrous solvent or mixture of solvents.

8. The method of claim 1, wherein the environment comprises one or more inert gases.

9. The method of claim 1, wherein the environment comprises carbon dioxide.

10. A method for forming a prelithiated, layered anode material, the method comprising:
    ball milling an ionic compound and a lithium precursor to form an admixture, wherein the ionic compound is a three-dimensional layered material represented by MX$_2$, where M is one of calcium (Ca) and magnesium (Mg) and X is one of silicon (Si), germanium (Ge), and boron (B), and the lithium precursor is selected from the group consisting of LiH, LiC, LiOH, LiCl, and combinations thereof; and
    heating the admixture to a high temperature greater than or equal to about 200° C. to less than or equal to about 900° C., wherein the high temperature causes cations to move from the ionic compound to create openings in interlayer spaces or voids in the three-dimensional layered material thereby defining a two-dimensional layered material and the high temperature introduces lithium ions from the lithium precursor into the interlayer spaces or voids to form the prelithiated, layered anode material.

11. The method of claim 10, wherein a ratio of the ionic compound to the lithium precursor is greater than or equal to about 1:1 to less than or equal to about 5:1.

12. The method of claim 10, further comprising:
contacting the one or more exposed surfaces of the prelithiated, layered anode material with carbon dioxide to form one or more lithium carbonate layers on the one or more exposed surfaces of the prelithiated, layered anode material.

13. The method of claim 10, further comprising:
contacting the one or more exposed surfaces of the prelithiated, layered anode material with a chemical bath to form one or more coatings on the one or more surfaces of the prelithiated, layered anode material, wherein the chemical bath comprises an electrolyte.

14. The method of claim 10, further comprising:
separating the prelithiated, layered anode material and a remaining cationic material including the cations using a density separation process, wherein the prelithiated, layered anode material has a first density and the remaining cationic material has a second density, the first density being less than the second density, and wherein the density separation process comprises:
contacting the prelithiated, layered anode material with an anhydrous solvent or mixture of solvents having a third density that is between the first density and the second density, wherein upon stirring of the anhydrous solvent or mixture of solvents the prelithiated, layered anode material can be collected at a top surface of the anhydrous solvent or mixture of solvents and the remaining cationic material can be collected at a bottom surface of the anhydrous solvent or mixture of solvents.

15. A method for forming a prelithiated, layered anode material, the method comprising:
contacting an ionic compound and a lithium precursor in an environment having a temperature greater than or equal to about 200° C. to less than or equal to about 900° C., wherein the ionic compound is a three-dimensional layered material represented by $MX_2$, where M is one of calcium (Ca) and magnesium (Mg) and X is one of silicon (Si), germanium (Ge), and boron (B), and the contacting of the ionic compound and the lithium precursor in the environment causes removal of cations from the ionic compound to create openings in interlayer spaces or voids in the three-dimensional layered material thereby defining a two-dimensional layered material and causes introduction of lithium ions from the lithium precursor into the interlayer spaces or voids to form the prelithiated, layered anode material; and
separating the prelithiated, layered anode material and the remaining cationic material including the cations using a density separation process, wherein the prelithiated, layered anode material has a first density and the remaining cationic material has a second density, the first density being less than the second density, and wherein the density separation process comprises:
contacting the prelithiated, layered anode material with an anhydrous solvent or mixture of solvents having a third density that is between the first density and the second density, wherein upon stirring of the anhydrous solvent or mixture of solvents the prelithiated, layered anode material can be collected at a top surface of the anhydrous solvent or mixture of solvents and the remaining cationic material can be collected at a bottom surface of the anhydrous solvent or mixture of solvents.

16. The method of claim 15, wherein a ratio of the ionic compound to the lithium precursor is greater than or equal to about 1:1 to less than or equal to about 5:1.

17. The method of claim 16, wherein the lithium precursor is selected from the group consisting of: LiH, LiC, LiOH, LiCl, and combinations thereof.

18. The method of claim 16, further comprising:
contacting the one or more exposed surfaces of the prelithiated, layered anode material with carbon dioxide to form one or more lithium carbonate layers on the one or more exposed surfaces of the prelithiated, layered anode material.

19. The method of claim 16, further comprising:
contacting the one or more exposed surfaces of the prelithiated, layered anode material with a chemical bath to form one or more coatings on the one or more surfaces of the prelithiated, layered anode material, wherein the chemical bath comprises an electrolyte.

* * * * *